Aug. 13, 1940.　　　H. S. DWIGHT　　　2,211,650
VEHICLE STABILIZER
Filed July 18, 1938　　　2 Sheets-Sheet 1

INVENTOR.
Harold S. Dwight
BY
Wood & Wood, ATTORNEYS.

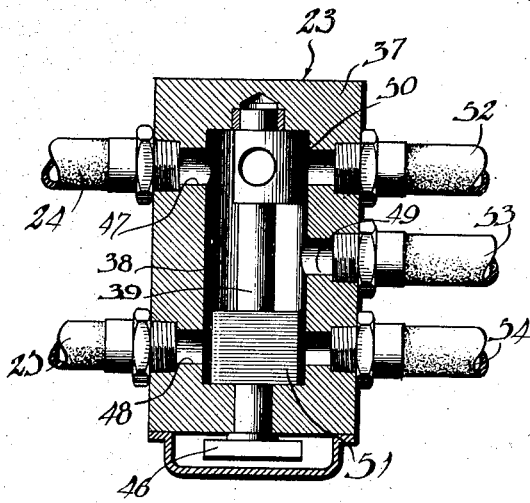
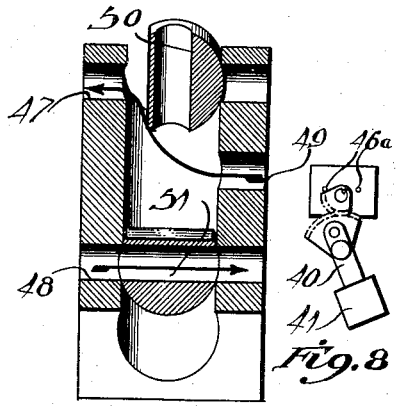
Fig. 6  Fig. 7
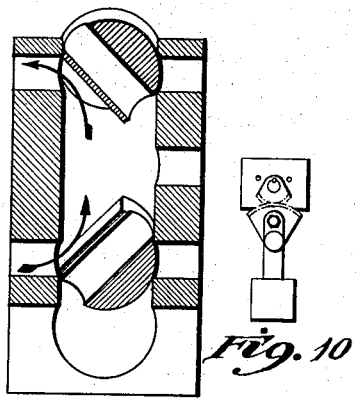
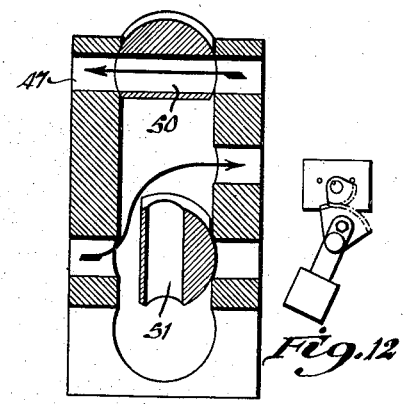
Fig. 9  Fig. 10  Fig. 11  Fig. 12
INVENTOR.
Harold S. Dwight
BY
Wood & Wood, ATTORNEYS.

Patented Aug. 13, 1940

2,211,650

UNITED STATES PATENT OFFICE 2,211,650

VEHICLE STABILIZER

Harold S. Dwight, Cincinnati, Ohio

Application July 18, 1938, Serial No. 219,795

6 Claims. (Cl. 267—11)

This invention relates to power operated hydraulic stabilizing mechanisms for motor vehicles. The present mechanism is intended primarily for use on passenger cars or buses to impart lateral stability to the body for the safety and comfort of the passengers. The apparatus is power driven hydraulically and operates automatically to counteract the side sway or tilt which usually develops in rounding curves at high speed, for instance, or when driving on wavy roads or upon those which have a high center or crown.

In the past it has been proposed to provide stabilizing apparatus to equalize the relative movements between the running gear and the body and thus maintain the body laterally parallel with the running gear at all times. However, for successful stabilization it is necessary to control the angle of the body independent of the running gear, otherwise the body will tilt or sway according the the roadway. Moreover, such devices interfere with the resiliency of the springs, because road shocks are transmitted from one spring to another for equalizing spring movements. They detract from the car's riding comfort.

With these difficulties in mind, it has been the objective of this invention to provide fluid power driven stabilizing apparatus for automobiles and the like, by means of which the body of the vehicle is maintained in a substantially level lateral plane, independent of the angle of the running gear, or roadway, or of any other force tending to tilt or sway the body sideways.

A further objective has been to provide a power mechanism capable of altering the relationship of the wheels of a vehicle to the chassis or body thereof, in conjunction with a controller for the power mechanism that is responsive to the movement of the chassis as it tends to move from "righted," or safe driving position, so that the power mechanism is effective to tilt or bank the body of the vehicle, to maintain it in the righted or safer or comfortable driving position.

Another objective of the invention has been to provide a body-tabilizng or leveling mechanism which does not affect the normal resilience and independent action of the car springs.

In the present apparatus the angle of the body is controlled by fluid power means independent of the running gear through an hydraulic control valve responsive to an inertia, or pendulum operated, controller. The mechanism is so controlled that the body is maintained in a substantially true horizontal plane, irrespective of road conditions, when the car is traveling on a straight course. Upon rounding a curve, the body naturally tends to tilt or sway to the outside of the curve but under such conditions, due to centrifugal force exerted upon the inertial controller, the valve is actuated and the power apparatus is operated to counteract the tilting force.

Briefly described, the invention employs a source of fluid power, either air or oil being the medium, in connection with power cylinders which are selectively energized by the fluid power which is controlled through a selector valve by the automatic pendulum pilot or selector. The stabilizing pistons, which are normally inoperative, are interposed between the chassis of the car and the springs. The "pilot" or pendulum normally hangs vertical relative to the body, in which position the control valve bypasses the pump pressure. When the pendulum is swung either to the right or left, the pistons on the side of the body in the direction of swing are energized to raise that side of the body and lower the opposite side relative to the axles. Therefore, when the car is rounding a curve, the centrifugal force swings the pendulum toward the outside of the curve to tilt the body in the opposite direction. This movement actuates the valve, bringing the stabilizing pistons in operation to maintain the car in normal, righted position.

A similar condition arises when the car is driven over a straight road having a high crown or a series of waves tending to tilt the body sideways. In this instance the pendulum is affected by gravity rather than by centrifugal force. As the body tilts sideways, the pendulum remains vertical thus energizing the appropriate power pistons to restore or maintain the body at right angles to the pendulum, thereby leveling the body.

It will be noted that in the former instance, stabilizing movement is initiated when the pendulum is swung angularly by centriful force and is no longer at right angles to the body. In the latter instance, the pendulum remains vertical by gravity while the change in the angle of the body initiates leveling movement. In either case, the movement continues until the lateral axis of the body is at the normal "righted" or perpendicular position in respect to the "pilot," at which time the movement ceases.

The accompanying drawings illustrate a preferred embodiment of the invention, and the principles upon which the invention is predicated. In these drawings:

Figure 6 is a sectional view through the control valve taken on line 6—6 of Figure 4.

Figures 7 to 12 inclusive are diagrammatic views detailing the various passageways of the valve and illustrating the flow of fluid as determined by the positions of the pilot pendulum.

Figures 3, 4, 5, 13, 14:
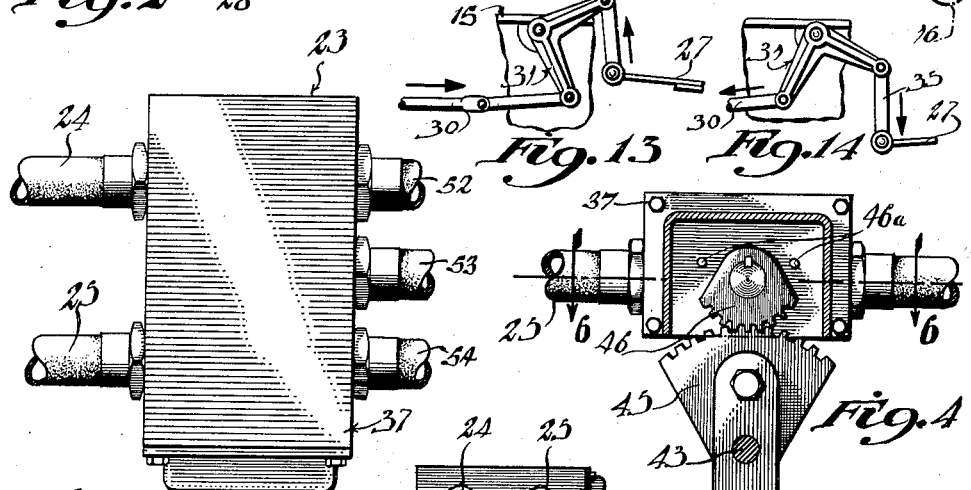
Figure 3 is a top plan view of the control valve.
Figure 4 is a fragmentary view illustrating the connection of the pendulum to the control valve.
Figure 5 is a side elevation of the valve.

Figures 13 and 14 are diagrammatic views illustrating the action of the stabilizing units in raising and lowering opposite sides of the chassis.

Figure 1:
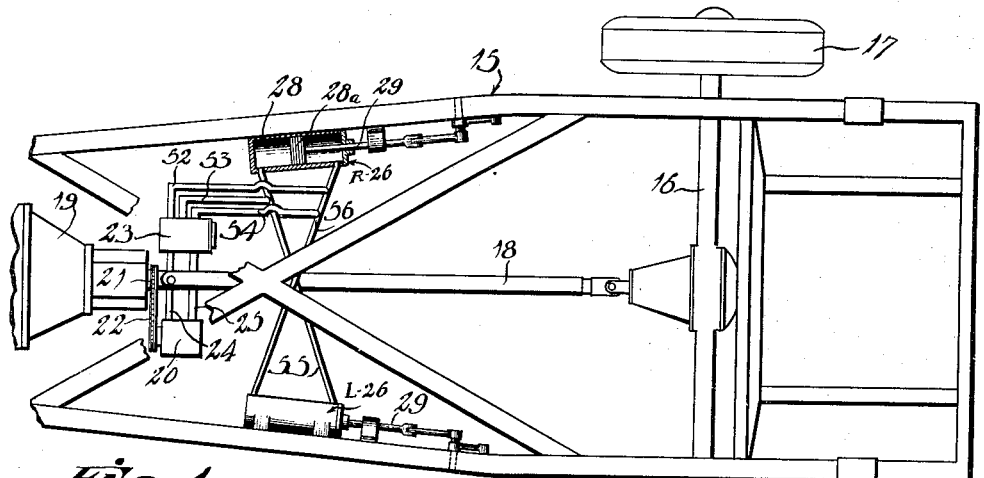
Figure 1 is a diagrammatic top plan view of an automobile chassis with the improved hydraulic stabilizing apparatus installed thereon.

The chassis or frame of the automobile is indicated generally at 15 in Figure 1, and represents a typical rear portion of a passenger car. The chassis is provided in the conventional manner with a rear axle 16, wheels 17, a propeller or drive shaft 18, and a transmission 19.

The hydraulic pump 20, for energizing the stabilizing system, is located at the rear of the transmission and is driven from the propeller shaft by means of a sprocket 21 secured thereon and in driving connection with the pump through the sprocket chain 22. The pump 20 is hydraulically connected to the control vale 23 by means of pipes or conduits 24 and 25. These pipes conduct the fluid under pressure from the pump to the valve 23, the pipe or conduit 24 being the pressure line and pipe 25, the return line. The hydraulic pump is preferably in constant driving connection with the propeller shaft so as to be operated whenever the car is in motion. In normal position, the valve 23 bypasses the fluid, permitting it to circulate freely through the valve, as shown in Figures 9 and 10.

The system, as illustrated, is provided with a right and left pair of stabilizing units designated as R—26 and L—26 secured on opposite sides of the chassis adjacent to the ends of the springs 27. In order to simplify the disclosure, the actuating units are shown applied on the rear springs only. When desirous of installing the units on the front springs also, the front and rear units of each side are connected in common to the respective valve outlets.

Figure 2:
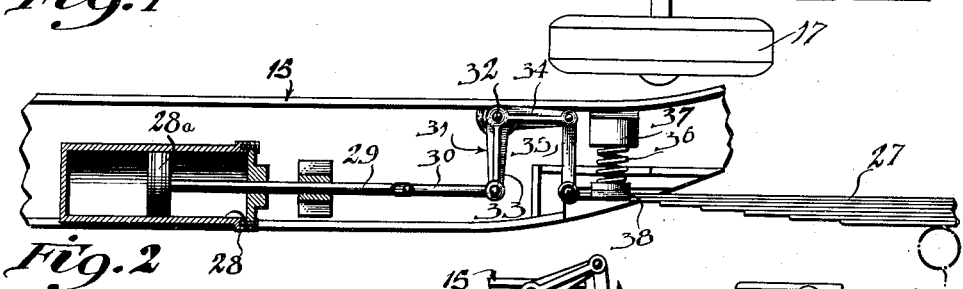
Figure 2 is a fragmentary side elevation illustrating, in detail, one of the hydraulic stabilizing units in operative connection with a spring of the car.

Each of the stabilizing units 26 consists of an hydraulic cylinder 28 and a piston 28a. The piston includes a rearwardly extended connecting rod 29 to which is pivoted a link 30. This link in turn is connected to a bell crank lever 31. The bell crank lever is pivoted on a bearing 32 and comprises a downwardly extended arm 33 and a horizontal rearwardly extended arm 34. The forward end of the spring 27, in place of the usual shackle, is connected to the bell crank by means of an extended link 35 which is pivoted to the arm and to the end of the spring, in the manner of a spring shackle. The spring is further provided with a supplemental coil spring 36 in compression between the flat spring 27 and the frame or chassis 15 upon which the load is sustained. The spring 36 is mounted in a pair of sockets 37 and 38, respectively mounted on the side frame and the spring. The coil spring 36 counterbalances the load on the mainspring to support the chassis in neutral position as shown in Figure 2. Actuation of the stabilizing unit in one direction or the other compresses or expands the coil spring, assisting in the operation of stabilizing the car.

The control valve 23 comprises a housing 37 having a bore 38 and a rotary valve member 39 mounted within the bore. The rotary valve member is controlled by a "pilot" pendulum 40, having at its lower end a weight 41, and pivoted at its upper end, as at 43, upon a bracket 44, secured to the valve. This pilot is responsive to centrifugal forces acting upon it during the periods when a car is rounding a turn, and also to movement of the car as it departs from level lateral position. It therefore constitutes the controller through which the valve is operated to maintain the car in safe driving position. The upper end of the pendulum includes a gear segment 45, secured thereon and in mesh with a gear segment 46, keyed to the rotary valve element 39. A pair of stop pins 46a secured in the body of the valve serves to limit the movement of the gear segment and pendulum.

The body of the valve is provided at opposite ends with cross passageways 47 and 48. These passageways communicate with the longitudinal bore of the valve, and are opened or closed by means of the rotary valve element. The valve body also is provided at one side with an intermediate passageway 49, also in communication with the bore of the valve. The rotary valve element includes a pair of ports, namely, 50 and 51, operative between the passageways 47 and 48 respectively. These ports are disposed at right angles to each other for alternate operation of one or the other of the passageways 47 and 48. The valve is connected to the power units R—26 and L—26 by means of the conduits 52, 53, and 54. The conduits 52 and 54 are in common connection with a conduit 56 which extends between the two actuating units and connects on opposite ends of the cylinders thereof. The conduit 53 is connected to a similar conduit 55 which, in the same manner, extends between both power units and is connected to opposite ends of the cylinders.

Figures 9 and 10 of the drawings illustrate the position of the valve when it is in neutral position. The passageways 47 and 48 on the right-hand side of the valve are closed. In this position the valve is in "bypassing" relationship with the pump, and permits the fluid from the pump to circulate freely through the system.

Figures 7 and 8 illustrate the action of the control valve as the pendulum is swung to the right, for instance, in making the left-hand turn. In this position the passageway 48 is open across the valve permitting the pressure side of the pump to connect with the conduit 54, which by its connection to the conduit 56 applies pressure to the rearward end of the right-hand power unit R—26 and the forward end of the left-hand power unit L—26. This will move the piston of the power unit R—26 forwardly and swing the bell crank lever 31 upon its pivot to move the arm 34 downwardly, as shown in Figure 14. This movement is transmitted through the link 35 to the spring 27, thus expanding the spring 36 and raising the right side of the frame and body of the car. At the same time, the power unit L—26 operates in the reverse direction, to lower the left side of the frame. The body is held in this position as long as the car is on the curve or tends to tilt sideways. When the car becomes righted, then the pendulum swings to its perpendicular position (or the pendulum remains vertical while the car moves to horizontal lateral position); the fluid from the pump is permitted to pass by the valve, and the lines 54 and 56 are relieved to permit the springs 36 to return the frame to level position. This position corresponds to that shown in Figure 2, in which the valve is in neutral position.

When the car is in a right-hand turn, the pendulum swings to the left as illustrated in Figures 11 and 12. In this position, the valve passageway 47 is open to relieve the rearward end of the right-hand stabilizing unit R—26 and the forward of the left-hand unit L—26, while the center passageway 49 is open to the line 53. This line applies pressure to the forward end of the unit R—26 and to the rearward end of unit L—26. The stabilizing units will then operate in the same manner as described above, in this instance however, in a direction to tilt the body to the left as illustrated in Figure 13.

The pistons 28a are normally positioned midway of the length of the cylinder when the valve 20 is at neutral, through the action of the supplemental coil springs 36. The action of the right and left-hand units is simultaneous when the valve is actuated, the units on opposite sides of the car moving in opposite directions for raising one side and lowering the other. The resiliency, or independent action of the individual springs, is not interferred with, either when the mechanism is in operation, or at neutral.

From the foregoing description, it will be evident that the system is entirely self acting in maintaining the body at or substantially at a constant state of equilibrium regardless of the forces acting upon it. The pendulum is responsive either to gravity or to centrifugal force, and the valve from which it is suspended is secured to the chassis or body of the car. Therefore, so long as the lateral axis of the body is approximately level or at right angles to the perpendicular pendulum, the valve is at neutral and the stabilizing system is inactive. When the car is tilted sideways, for instance while it is traveling on a straight road, the pendulum still remains perpendicular, but the angular relationship of the valve to the pendulum is altered. This energizes the proper stabilizing unit to reestablish the perpendicular relationship of the pendulum to the axis of the body, thus substantially leveling the body.

When the pendulum is swung angularly as influenced by centrifugal force in making a turn, the converse is true; the angle of the pendulum is altered relative to the axis of the body, and again the stabilizing units are energized. As determined by the degree of the angle between the pendulum and the body, the axis of the body is tilted to a position approximately at "righted" angle with the pendulum.

Having described by invention, I claim:

1. In a vehicle having an axle, a body, spring means supported on said axle and supporting said body, power operated means connected to said spring means actuable to control the angular relationship of the body to the axle by raising and lowering said springs, a power driven fluid pump, an automatic control valve connected to said pump, a pendulum responsive to centrifugal force and to tilting of the vehicle controlling said automatic valve, and conduits connecting the said power operated means to said valve for operation thereby to maintain the lateral axis of the body substantially at right angles to the pendulum.

2. In a vehicle having an axle, a chassis, and support springs between the chassis and the axle, power devices mounted on opposite sides of the chassis, power means for energizing the devices, said devices having connecting members between the spring and the chassis and actuable to raise and lower respective opposite sides of the chassis relative to the axle, supplemental springs between the chassis and the support springs normally operative to sustain the chassis laterally parallel with the axle, said elevating devices normally deenergized, and an automatic controller which is responsive to alteration of the angular relationship of the chassis to the wheels for selectively energizing said power units in directions to counteract forces tending to tilt the body.

3. The combination of a vehicle and a chassis having a pair of wheels, spring means intermediate the chassis of the respective wheels of the pair, power cylinders respectively intermediate said spring means and said chassis for altering the relationship of the chassis to the wheels, a source of fluid power, and a pendulum controller including a valve which is responsive to alteration of the relationship of the chassis to the wheels and which is in connection with the power cylinder means and the source of power fluid for controlling the power cylinder means to alter the relationship of the chassis and the wheels to maintain the chassis in righted position as it tends to move therefrom.

4. The combination of a vehicle having a chassis, spring means mounted upon the chassis, an axle carried by the spring means and carrying wheels at opposite sides of the chassis, fluid power cylinders carried by the chassis at opposite sides thereof and including pistons for raising and lowering the respective opposite ends of the axle, a source of fluid power and conduits therefrom to said respective power cylinders, a valve for controlling the flow of fluid power from the source, a pendulum which is responsive to alterations in the relationship between the chassis and the axle, and arranged to control said valve to admit fluid power to said power cylinders, so as to maintain the chassis in righted position when it tends to move therefrom.

5. A vehicle, including a chassis, axle spring means carried by said chassis, and road wheels resiliently mounted upon said spring means, through the intermediary of the axle, fluid power cylinder means respectively interconnecting said springs, chassis, and road wheels, for moving the respective road wheels toward and away from the chassis, a source of fluid power, a valve controlling the flow of fluid power from said source, a pendulum responsive to centrifugal force and tilting of the said chassis controlling said valve, and conduits for admitting power fluid to said power cylinder means from said valve.

6. In a vehicle of the class described, a chassis, a pair of fluid power members carried by the chassis at opposite sides thereof, spring means carried by the fluid power members respectively and road wheels carried by the spring means, a source of fluid power, conduits interconnecting said fluid power members and said source of fluid power for effecting raising and lowering the opposite sides of said chassis relative to said road wheels through actuation of the fluid power members, a valve for controlling the flow of power fluid through said conduits, and a pendulum responsive to centrifugal force and tilting movement of said chassis for controlling said valve.

HAROLD S. DWIGHT.